Patented June 19, 1951

2,557,744

UNITED STATES PATENT OFFICE 2,557,744

PREPARATION OF A METAL CARBONYL FROM TUNGSTEN OR MOLYBDENUM OXYCHLORIDE

Dallas T. Hurd, Schenectady, N. Y., assignor to General Electric Company, a corporation of New York No Drawing. Application June 6, 1950,
Serial No. 166,553

3 Claims. (Cl. 23—203)

The present invention relates to the preparation of a metal carbonyl from a metal oxychloride. Specifically, the invention is concerned with the preparation of tungsten or molybdenum carbonyl from tungsten or molybdenum oxychloride or tungsten and molybdenum chlorides containing the oxychloride as impurity.

While it is known that the oxytetrachlorides of tungsten and molybdenum will react with carbon monoxide to form the corresponding metal carbonyls, the yields of the desired products have been relatively low. For that reason, the carbonyls of tungsten and molybdenum are ordinarily prepared from tungsten hexachloride or molybdenum pentachloride.

The present invention is based on the discovery that yields of the carbonyl comparable to those attained from tungsten hexachloride, for example, can be obtained from tungsten oxytetrachloride if the reaction between the chloride and the carbon monoxide is carried out in the presence of a few percent of added carbonyl of a metal of the iron group, that is, iron carbonyl, cobalt carbonyl, or nickel carbonyl. By the addition of a carbonyl of an iron group metal, it has been found that the yield of molybdenum or tungsten carbonyl from an inferior grade of the chlorides of these metals containing substantial amounts of the oxytetrachloride or from the oxytetrachlorides themselves is increased by a factor of two or three.

In order that those skilled in the art better may understand how the present invention can be carried into effect, the following illustrative examples are given.

*Example 1.*—Ten grams of a chlorinated tungsten compound approximating tungsten oxychloride $WOCl_4$ in content of chlorine was reacted with ten grams of 30 mesh powdered aluminum and carbon monoxide. The reaction was performed in a pressure vessel of 300 ml. capacity in the presence of 100 ml. of anhydrous ethyl ether and a carbon monoxide pressure of 1500 p. s. i. at a temperature of 100° C. for a period of about 16 hours. At the end of the reaction period, the tungsten carbonyl product was recovered by steam distillation of the reaction mixture. The product isolated was 1.9 grams of tungsten hexacarbonyl representing a yield of approximately 20%.

In this example, the aluminum functions as a reducing metal in the manner more fully described and claimed in my copending application, Serial No. 166,551, now Patent No. 2,554,194, filed concurrently herewith and assigned to the same assignee as the present invention.

*Example 2.*—Example 1 was repeated except that five milliliters of iron pentacarbonyl were added to the reaction mixture prior to the reaction. The product isolated from this reaction mixture was 6.5 grams of tungsten carbonyl, representing a yield of approximately seventy-three percent of the theoretical.

*Example 3.*—The experiment of Example 1 was duplicated except that five milliliters of nickel carbonyl were added prior to the reaction and the reaction period was shortened to four hours. The product isolated comprised 5.6 grams of tungsten carbonyl, representing a yield of approximately sixty-three percent.

*Example 4.*—The conditions of Example 1 were duplicated except that five grams of finely powdered iron were added to the reaction mixture prior to the reaction and the reaction period was shortened to three and one-half hours. The product comprised 3.8 grams of tungsten carbonyl representing a yield of approximately forty-three percent. The results of this run indicate that iron in a form capable of forming iron pentacarbonyl under the conditions of the reaction has a catalytic influence on the conversion of the lower tungsten chloride, that is, the conversion of tungsten oxytetrachloride to tungsten carbonyl.

*Example 5.*—The process of Example 1 was repeated except that two grams of anhydrous iron chloride was added to the reaction mixture prior to reaction and the reaction time was four hours. The reaction product comprised 0.9 gram of tungsten carbonyl or a yield of approximately ten percent. This example is believed to indicate that an iron compound that does not generally form iron carbonyl under the conditions of the reaction will not act as a catalyst for the conversion of the tungsten oxychloride to the carbonyl. In other words, the catalytic effect appears to be a specific one dependent upon the presence of the iron or other iron group metal carbonyl rather than merely upon the presence of iron or an iron group metal as such or in the form of some other compound thereof.

*Example 6.*—Example 1 was repeated except that the reducing agent was fifteen grams of a powdered alloy of fifty percent copper, forty-five percent aluminum and five percent zinc. The reaction time was also shortened to four hours. The yield comprised 1.8 grams of tungsten carbonyl, representing a yield of approximately twenty percent.

*Example 7.*—When the process of Example 6 was repeated with the addition of 5 ml. of iron pentacarbonyl to the reaction mixture prior to the reaction, there was obtained 4.9 grams of tungsten carbonyl at the end of reaction time of 2½ hours. This yield of tungsten carbonyl represented about fifty-five percent of the theoretical.

*Example 8.*—In a preparation similar to that of Example 6 except that 20 grams of the reducing alloy were used and 3 ml. of a dilute solution of cobalt carbonyl in benzene were added to the reaction mixture, there was obtained 3.7 grams of tungsten carbonyl at the end of a reaction time of 2¼ hours. This represented a yield of approximately 42%.

Comparable increases in the yield of metal carbonyl may also be obtained when molybdenum oxytetrachloride is substituted for the tungsten oxytetrachloride of the above examples.

From the above examples, it would be seen that when there is added to the reaction mixture a carbonyl of an iron group metal as such, or when conditions are such that such carbonyl of an iron group metal will be formed during the reaction time, at least a 100% increase in the yield of the tungsten or molybdenum carbonyl can be obtained from a given quantity of the corresponding metal oxychloride.

It is believed that the effect of the iron group metal carbonyl is specific to the oxytetrachloride reaction or to reactions in which a substantial quantity of the oxytetrachloride is present. For example, when tungsten hexachloride is used as a starting reactant, the yields are generally good and the presence of an added carbonyl such as iron carbonyl has no significant effect on the amount of final product obtained.

What I claim as new and desire to secure by Letters Patent of the United States is:

1. The method of increasing the yield of carbonyl obtained by reaction of an oxychloride of tungsten or molybdenum with carbon monoxide which comprises carrying out the reaction in the presence of a small amount of a carbonyl of an iron group metal.

2. In the preparation of a carbonyl from an oxychloride of a metal selected from the group consisting of tungsten and molybdenum, the step which comprises carrying out said reaction in the presence of a small amount of a carbonyl of the metal selected from the group consisting of iron, nickel, and cobalt.

3. The method which comprises effecting reaction between tungsten oxytetrachloride and carbon monoxide in the presence of a carbonyl of a metal of the group consisting of iron, nickel, and cobalt.

DALLAS T. HURD.

REFERENCES CITED

The following references are of record in the file of this patent:

UNITED STATES PATENTS

| Number | Name | Date |
| --- | --- | --- |
| 2,004,534 | Muller et al. | June 11, 1935 |

OTHER REFERENCES

Mond, "The Metal Carbonyls," June 13, 1930, vol 49, No. 24. Jour. of the Society of Chem. Industry, pages 276T and 277T.